Patented July 22, 1947

2,424,311

UNITED STATES PATENT OFFICE 2,424,311

PROCESS FOR MAKING ESTERS OF 7,8-DIAMINO NONOIC ACID

Stanton A. Harris, Westfield, N. J., assignor to Merck & Co. Inc., Rahway, N. J., a corporation of New Jersey No Drawing. Application November 10, 1943, Serial No. 509,772

12 Claims. (Cl. 260—482)

This invention relates to the synthesis of organic chemical compounds, particularly intermediates useful in preparing 7:8-diaminononoic esters. These esters are obtainable from degradation products of the vitamin biotin, and can be used in the synthesis of the vitamin and also of other valuable organic chemical compounds such as desthiobiotin.

According to the present invention it is found that acetoacetic ester in the presence of an alkali-metal alcoholate, or an alkali-metal derivative of acetoacetic ester, can be reacted with an omega-halo-caproic ester to produce an α-acetylsuberic ester, which can be decarboxylated upon hydrolysis to give 8-ketononoic acid. This acid, after esterification, can be reacted successively with an alkyl nitrite and hydroxylamine to yield the corresponding 7:8-dioximinononoic ester, from which, after reduction, the desired 7:8-diaminononoic esters are obtained. These reactions can be indicated as follows:

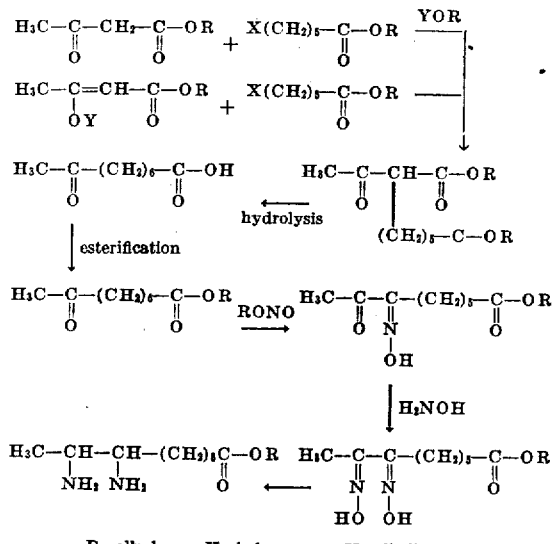

R=alkyl    X=halogen    Y=alkali metal

The following example illustrates a method of carrying out the present invention, but it is to be understood that this example is given by way of illustration and not of limitation.

Example

1. *Condensation of omega-halo-caproic ester with an alkalimetal derivative of acetoacetic ester.*—About 130 g. (1 mol) of ethyl acetoacetate are slowly added with cooling to a solution obtained by dissolving about 23 g. (1 atom) of clean sodium wire in approximately 350 cc. of absolute ethanol under a reflux. About 223 g. (1 mol) of ethyl omega-bromo-caproate are then slowly added and the whole refluxed upon a water bath until it shows a substantially neutral reaction. The alcohol is removed upon a water bath. The condensation product is ethyl α-acetyl-suberate (B. P. 144-148 at .9 mm.). About 20.3 g. of this product is dissolved in diethylene glycol containing about 8 g. of sodium hydroxide, and the mixture is then heated on a steam bath for 30 minutes. After cooling, the mixture is diluted with water, slightly acidified with sulfuric acid and extracted with chloroform. The product, 8-ketononoic acid, is recovered by distillation of the chloroform extract (M. P. 39-40° C., B. P. 135° at 0.9 mm.).

2. *Esterification of 8-ketononoic acid.*—About 172 g. (1 mol) of 8-ketononoic acid, approximately 250 cc. of anhydrous ethanol (excess) and about 15 g. of concentrated sulfuric acid are refluxed for several hours. The ethyl 8-ketononoate is separated by distillation (B. P. 91-96° at 0.4 mm.).

3. *Reaction of 8-ketononoic ester with alkyl nitrite and hydroxylamine.*—About 200 g. (1 mol) of ethyl 8-ketononoat are dissolved in alcohol containing a little hydrochloric acid and gaseous ethyl nitrite is bubbled through the solution at 45-50° C. until reaction is substantially complete. Approximately 139 g. (2 mols) of hydroxylamine hydrochloride and about 50 g. of sodium acetate, dissolved in the minimum quantity of water, are then added to the reaction mixture; the whole is heated upon a steam bath for about 30 minutes, cooled and then diluted with water to cause separation of the product, ethyl 7:8-dioximinononoate (M. P. 107-108° C.).

4. *Reduction of 7:8-dioximinononoic ester.*—Approximately 244 g. (1 mol) of ethyl 7:8-dioximinononoate are dissolved in a minimum quantity of alcohol containing liquid ammonia and Raney nickel catalyst, placed in a steel bomb, and hydrogenated at 50-60° C. until gas absorption ceases. The catalyst is removed by filtration and ammonia remaining on the product is evaporated at reduced pressure. The residue is then dissolved in a minimum quantity of ethanol and sulfuric acid is added until just acid to Congo red. The sulfate of ethyl 7:8-diaminononoate (M. P. 274° C. with decomposition) separates and can, if desired, be recrystallized from ethanol. When treated with basic substances such as sodium hydroxide or sodium carbonate, the ester sulfate yield free ethyl 7:8-diaminononoate.

When, in the foregoing reactions homologous acetoacetates are employed, corresponding α-acetyl-suberates are obtained, for instance methyl acetoacetate condensed with methyl omega-bromo-caproate would produce dimethyl α-acetyl-suberates, and likewise with other alkyl groups. Other liquid lower alcohols or similar organic solvents can be used where ethanol is used as a solvent. Hydrolysis of the α-acetyl-suberic ester can be effected by treatment with other glycols, or can be effected by treatment with aqueous alkali alone, if desired. If it is desirable to produce a 7:8-diaminononoic ester other than the ethyl ester, it will be evident that this can be easily effected by selection of the appropriate alkylating agent in the esterification reaction. Homologous alkyl nitrites can be substituted for ethyl nitrite in the nitrosation reaction.

Modifications may be made in carrying out the present invention without departing from the spirit and scope thereof and the invention is to be limited only by the appended claims.

What is claimed is:

1. The process which comprises treating a lower alkyl ester of 8-keto-nonoic acid with an alkyl nitrite under slightly acidic conditions and treating the reaction product with hydroxylamine to produce a lower alkyl ester of 7:8-dioximino-nonoic acid, and catalytically hydrogenating said alkyl 7:8-dioximino-nonoate in alcoholic ammonia solution in the presence of Raney nickel catalyst to produce the corresponding lower alkyl ester of 7:8-diamino-nonoic acid.

2. The process which comprises treating ethyl 8-keto-nonoate with ethyl nitrite in a solvent under slightly acidic conditions and treating the reaction product with hydroxylamine to produce ethyl 7:8-dioximino-nonoate in alcoholic ammonia solution in the presence of Raney nickel catalyst to produce ethyl 7:8-diamino-nonoate.

3. The process that comprises treating a lower alkyl ester of 8-keto-nonoic acid with an alkyl nitrite in a solvent under slightly acidic conditions to produce the corresponding lower alkyl ester of 7-oximino-8-keto-nonoic acid.

4. The process that comprises treating ethyl 8-ketononoate with ethyl nitrite in a solvent under slightly acidic conditions.

5. The process that comprises treating a lower alkyl ester of 8-keto-nonoic acid with an alkyl nitrite in a solvent under slightly acidic conditions, and treating said reaction product with hydroxylamine to produce the corresponding lower alkyl ester of 7:8-dioximino-nonoic acid.

6. The process that comprises treating ethyl 8-ketononoate with ethyl nitrite in a solvent under slightly acidic conditions and treating said reaction product with hydroxylamine to produce ethyl 7:8-dioximinononoate.

7. The process that comprises catalytically hydrogenating a lower alkyl ester of 7:8-dioximino-nonoic acid in alcoholic ammonia solution in the presence of Raney nickel catalyst to produce the corresponding lower alkyl ester of 7:8-diamino-nonoic acid.

8. The process that comprises catalytically hydrogenating ethyl 7:8-dioximino-nonoate in alcoholic ammonia solution in the presence of Raney nickel catalyst to produce ethyl 7:8-diamino-nonoate.

9. A lower alkyl ester of 7:8-dioximino-nonoic acid.

10. Ethyl 7:8-dioximinononoate.

11. A lower alkyl ester of 7:8-diamino-nonoic acid.

12. Ethyl 7:8-diaminononoate.

STANTON A. HARRIS.

REFERENCES CITED

The following references are of record in the file of this patent:

Vigneaud et al., "Jour. Biol. Chem.," vol. 146, pp. 475–485 (1942).

Vigneaud et al., "Jour. Am. Chem. Soc.," vol. 63, p. 3237 (1941); ibid., vol. 64, pp. 188–189 (1942).

Godchot et al., "Comptes Rendus," vol. 192, pp. 962–964 (1931).

Lease et al., "Jour. Am. Chem. Soc.," vol. 55, pp. 806–808 (1933).

Karrer, "Organic Chemistry," 1938, Eng. edition, pp. 115, 154, 155, 242, 243.

Certificate of Correction

Patent No. 2,424,311.   July 22, 1947.

STANTON A. HARRIS

It is hereby certified that error appears in the printed specification of the above numbered patent requiring correction as follows: Column 3, line 40, claim 2, after "nonoate" insert the comma and words , *and catalytically hydrogenating said ethyl 7:8-dioximino-nonoate*; and that the said Letters Patent should be read with this correction therein that the same may conform to the record of the case in the Patent Office.

Signed and sealed this 16th day of September, A. D. 1947.

[SEAL]

THOMAS F. MURPHY,
*Assistant Commissioner of Patents.* dium hydroxide or sodium carbonate, the ester sulfate yield free ethyl 7:8-diaminononoate.

When, in the foregoing reactions homologous acetoacetates are employed, corresponding α-acetyl-suberates are obtained, for instance methyl acetoacetate condensed with methyl omega-bromo-caproate would produce dimethyl α-acetyl-suberates, and likewise with other alkyl groups. Other liquid lower alcohols or similar organic solvents can be used where ethanol is used as a solvent. Hydrolysis of the α-acetyl-suberic ester can be effected by treatment with other glycols, or can be effected by treatment with aqueous alkali alone, if desired. If it is desirable to produce a 7:8-diaminononoic ester other than the ethyl ester, it will be evident that this can be easily effected by selection of the appropriate alkylating agent in the esterification reaction. Homologous alkyl nitrites can be substituted for ethyl nitrite in the nitrosation reaction.

Modifications may be made in carrying out the present invention without departing from the spirit and scope thereof and the invention is to be limited only by the appended claims.

What is claimed is:

1. The process which comprises treating a lower alkyl ester of 8-keto-nonoic acid with an alkyl nitrite under slightly acidic conditions and treating the reaction product with hydroxylamine to produce a lower alkyl ester of 7:8-dioximino-nonoic acid, and catalytically hydrogenating said alkyl 7:8-dioximino-nonoate in alcoholic ammonia solution in the presence of Raney nickel catalyst to produce the corresponding lower alkyl ester of 7:8-diamino-nonoic acid.

2. The process which comprises treating ethyl 8-keto-nonoate with ethyl nitrite in a solvent under slightly acidic conditions and treating the reaction product with hydroxylamine to produce ethyl 7:8-dioximino-nonoate in alcoholic ammonia solution in the presence of Raney nickel catalyst to produce ethyl 7:8-diamino-nonoate.

3. The process that comprises treating a lower alkyl ester of 8-keto-nonoic acid with an alkyl nitrite in a solvent under slightly acidic conditions to produce the corresponding lower alkyl ester of 7-oximino-8-keto-nonoic acid.

4. The process that comprises treating ethyl 8-ketononoate with ethyl nitrite in a solvent under slightly acidic conditions.

5. The process that comprises treating a lower alkyl ester of 8-keto-nonoic acid with an alkyl nitrite in a solvent under slightly acidic conditions, and treating said reaction product with hydroxylamine to produce the corresponding lower alkyl ester of 7:8-dioximino-nonoic acid.

6. The process that comprises treating ethyl 8-ketononoate with ethyl nitrite in a solvent under slightly acidic conditions and treating said reaction product with hydroxylamine to produce ethyl 7:8-dioximinononoate.

7. The process that comprises catalytically hydrogenating a lower alkyl ester of 7:8-dioximino-nonoic acid in alcoholic ammonia solution in the presence of Raney nickel catalyst to produce the corresponding lower alkyl ester of 7:8-diamino-nonoic acid.

8. The process that comprises catalytically hydrogenating ethyl 7:8-dioximino-nonoate in alcoholic ammonia solution in the presence of Raney nickel catalyst to produce ethyl 7:8-diamino-nonoate.

9. A lower alkyl ester of 7:8-dioximino-nonoic acid.

10. Ethyl 7:8-dioximinononoate.

11. A lower alkyl ester of 7:8-diamino-nonoic acid.

12. Ethyl 7:8-diaminononoate.

STANTON A. HARRIS.

REFERENCES CITED

The following references are of record in the file of this patent:

Vigneaud et al., "Jour. Biol. Chem.," vol. 146, pp. 475–485 (1942).

Vigneaud et al., "Jour. Am. Chem. Soc.," vol. 63, p. 3237 (1941); ibid., vol. 64, pp. 188–189 (1942).

Godchot et al., "Comptes Rendus," vol. 192, pp. 962–964 (1931).

Lease et al., "Jour. Am. Chem. Soc.," vol. 55, pp. 806–808 (1933).

Karrer, "Organic Chemistry," 1938, Eng. edition, pp. 115, 154, 155, 242, 243.

Certificate of Correction

Patent No. 2,424,311.            July 22, 1947.

STANTON A. HARRIS

It is hereby certified that error appears in the printed specification of the above numbered patent requiring correction as follows: Column 3, line 40, claim 2, after "nonoate" insert the comma and words , *and catalytically hydrogenating said ethyl 7:8-dioximino-nonoate*; and that the said Letters Patent should be read with this correction therein that the same may conform to the record of the case in the Patent Office.

Signed and sealed this 16th day of September, A. D. 1947.

[SEAL]

THOMAS F. MURPHY,
*Assistant Commissioner of Patents.*